United States Patent

Lawson, Jr.

[11] Patent Number: 5,875,633
[45] Date of Patent: Mar. 2, 1999

[54] COOLING SYSTEM FOR INTERNAL COMBUSTION ENGINES

[76] Inventor: Thomas Towles Lawson, Jr., 2815 Catawba Rd., Daleville, Va. 24083

[21] Appl. No.: 65,558

[22] Filed: Apr. 24, 1998

[51] Int. Cl.$^6$ .................................................. F01K 23/10
[52] U.S. Cl. ................................................................ 60/618
[58] Field of Search ............................................... 60/618

[56] References Cited

U.S. PATENT DOCUMENTS

| | | |
|---|---|---|
| 3,228,189 | 1/1966 | Baker . |
| 3,554,849 | 1/1971 | Wagner ..................................... 60/618 |
| 4,348,991 | 9/1982 | Stang et al. . |
| 4,586,338 | 5/1986 | Barrett et al. .............................. 60/618 |
| 4,901,531 | 2/1990 | Kubo et al. ................................ 60/618 |
| 5,339,632 | 8/1994 | McCrabb et al. ......................... 60/618 |

*Primary Examiner*—Michael Koczo
*Attorney, Agent, or Firm*—Laubscher & Laubscher

[57] ABSTRACT

A heat energy recovery system for cooling an internal combustion engine is characterized by separate oil and water circuits. The oil circuit is used to lubricate and cool the engine. A heat exchanger between the oil and water circuits cools the oil and produces steam from the water. The steam is used to power a steam engine in the water circuit which in turn is used to drive accessories normally driven by the engine. The recovery of heat from the cooling oil and the generation of energy via the steam engine reduces the load on the engine, decreasing its fuel consumption and increasing its net output to drive a vehicle.

4 Claims, 1 Drawing Sheet

5,875,633

COOLING SYSTEM FOR INTERNAL COMBUSTION ENGINES

BACKGROUND OF THE INVENTION

The present invention relates to an improved cooling system for internal combustion engines which utilizes a heat energy recovery system to improve the efficiency of the engine. This is accomplished using the principles of an external combustion steam engine.

The improved cooling system of the invention can be applied directly to an air-cooled engine or to the more modern air-oil cooled engine which uses oil both for lubrication and for cooling. Such engines include gasoline and diesel fueled engines, with or without a turbocharger. One problem, however, with air-oil cooled engines is the inability to effectively cool the oil for recirculation into the engine. Accordingly, many manufacturers have abandoned oil as a cooling substance in favor of more conventional water-cooled engines.

A major drawback of water-cooled engines is the inevitable leakage of water into the engine, effectively ruining it. One cause of water leakage is the expansion of water during freezing. Accordingly, antifreeze is normally added to the water to prevent freezing. Yet the use of antifreeze creates other problems, not the least of which is the inadvertent poisoning of children and animals who mistakenly drink spilled or improperly disposed antifreeze. Moreover, the antifreeze can also irreparably damage an engine should it leak into the engine cylinders or the oil owing to a malfunction of the engine.

BRIEF DESCRIPTION OF THE PRIOR ART

Dual circuit cooling systems for engines are well-known in the patented prior art. The Baker U.S. Pat. No. 3,228,189, for example, discloses a binary cycle engine heat recovery system using two separate fluid circuits. The cooling fluid circuit includes a heat exchanger for receiving vaporized coolant. A second circuit passes a second fluid through the heat exchanger to recondense the coolant and to heat the second fluid. The fluid is then passed in heat-exchange relation with exhaust gasses from the engine and becomes fully vaporized. The vapor is delivered to a turbine for energy production, then condensed and recirculated.

The Stang et al U.S. Pat. No. 4,348,991 discloses a dual loop cooling system for an internal combustion engine including a first loop having engine lubricating oil for cooling the engine cylinders and a second loop having water for cooling an aftercooler and the engine head.

While the prior devices operate satisfactorily, there still exists a need for an engine cooling system which utilizes lubricating oil as the primary coolant and which effectively cools the oil prior to recirculation, decreases fuel consumption, and provides a net power gain. The present invention was developed to meet these needs and can be used in connection with existing oil-cooled engines used on certain cars and motorcycles as well as on current water-cooled engines which can be readily modified to incorporate the heat energy recovery system of the invention.

SUMMARY OF THE INVENTION

Accordingly, it is a primary object of the present invention to provide a cooling system for internal combustion engines including an oil circuit for circulating oil through the engine for lubricating and cooling the same. A heat exchanger is arranged in the oil circuit for cooling oil from the engine prior to recirculating the oil to the engine. A separate water cooling circuit is provided for circulating water through the heat exchanger. Heat from the oil is transferred to the water to cool the oil and to generate steam. The steam is delivered to a steam engine in the water circuit to generate power. This power is used to drive a pump in the water circuit for circulating the water therethrough. Between the steam engine and the water pump, the water circuit includes an intercooler which converts excess steam back to water. In accordance with the invention, as the oil within the oil circuit becomes hotter, more steam is generated by the heat exchanger which in turn increases the output of the steam generator. Since the steam generator, rather than the engine, can be used to drive auxiliary components, the fuel consumption of the engine is decreased while its net power output is increased.

According to a more specific object of the invention, a refrigerant circuit is also provided in the cooling system. The refrigerant circuit is arranged between the oil and water circuits and includes a refrigerant compressor driven by the steam engine and through which hot oil from the engine is circulated. The compressor increases the pressure of the refrigerant and also increases the temperature of the oil. The refrigerant circuit also includes a second heat exchanger through which refrigerant and water are circulated to cool the water from the intercooler of the water circuit.

It is a further object of the invention to provide another heat exchanger in the refrigerant circuit between the refrigerant compressor and the second heat exchanger to cool the high pressure refrigerant with ambient air.

BRIEF DESCRIPTION OF THE FIGURE

Other objects and advantages of the invention will become apparent from a study of the following specification when viewed in the light of the accompanying drawing, in which.

DETAILED DESCRIPTION

Figure 1:
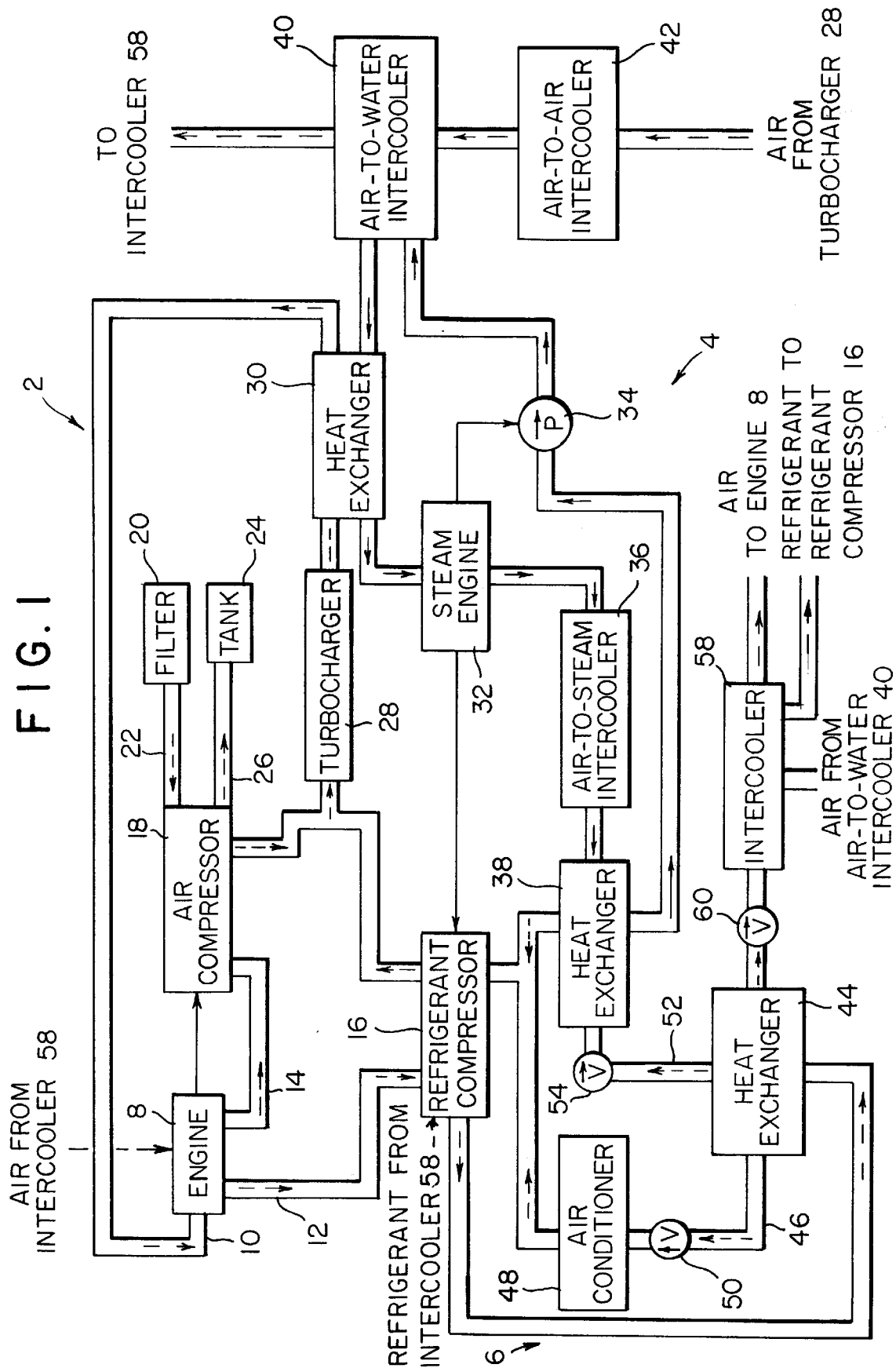
FIG. 1 is a circuit diagram of the heat energy recovery engine cooling system according to the invention.

As shown in FIG. 1 of the drawing, the heat energy recovery engine cooling system comprises three distinct and closed fluid circuits: an oil circuit 2, a water circuit 4, and a refrigerant circuit 6. The oil circuit contains oil which is used to lubricate and cool an engine which may be a diesel or gas internal combustion engine. Cool oil is delivered to an input 10 of the engine for cooling and lubrication. The oil is thus the primary cooling substance for the engine. Hot oil exits the engine from outlets 12, 14 from lubrication and cooling paths within the engine.

From the outlet 12, hot oil is delivered to a refrigerant compressor 16 of the refrigerant circuit 6 as will be developed in greater detail below. From the outlet 14, hot oil is delivered to an air compressor 18 which is driven by the engine 8. Cool air is drawn into the air compressor 18 via a filter 20 and inlet 22, and compressed air is supplied from an outlet 26 to a tank 24 where the compressed air is stored for lag elimination.

The refrigerant compressor 16 and the air compressor 18 both further heat the oil and supply it to a turbocharger 28 for vehicles so equipped. The hot oil from the turbocharger is delivered to a heat exchanger 30 where it passes in heat exhange relation with water from the water cirucit 4. Accordingly, cool oil exits the heat exchanger for recirculation to the engine.

Owing to the heat transfer from the oil in the heat exchanger 30, the water which enters the exchanger is converted to high energy stream therein. This steam is delivered to a steam engine 32 of the water circuit 4. The steam engine affords the energy recovery from the cooling system according to the invention. It is used to operate certain accessories normally driven off the engine 8. Accordingly, the load on the engine is reduced which in turn reduces its fuel consumption and increases the net power available to drive the vehicle (i.e. car, truck, or motorcycle) in which the engine is arranged.

As shown in the drawing, two accessories driven by the steam engine are the refrigerant compressor 16 of the refrigerant circuit 6 and a water pump 34 of the water circuit 4. The pump 34 circulates water through the water circuit. A one-way valve at the outlet of the pump 34 insures that water is circulated in the proper direction.

From the steam engine 32, low energy steam is delivered to an air-to-steam intercooler 36 where the steam is condensed back into a fluid state. The water is next delivered to a heat exchanger 38 where it passes in heat exchange relation with refrigerant from the refrigerant circuit 6. The water is cooled by the refrigerant in the exchanger 38 and the cold water is next delivered to the water pump 34 of the water circuit. From the pump, the cold water is suppled to air-to-water intercooler 40 where the cold water is used to further cool air from an air-to-air intercooler 42. The water which exits the air-to-water intercooler 40 is warmed by the air in the intercooler in a heat exchange manner. The warmed water is then supplied to the heat exchanger 30 for heat exhange with the oil from the oil circuit as set forth above.

The air-to-water intercooler 40 is the second stage of an air cooling system, the first stage of which is the air-to-air intercooler 42. Hot charge air from the compressor of the turbocharger 28 is supplied to the air-to-air intercooler 42 where it is exposed to ambient air to partially reduce the temperature thereof The turbocharged air temperature is further reduced in the air-to-water intercooler 40. Cool air from the outlet of the air-to-water intercooler 40 is supplied to the engine 8 via the refrigerant circuit 6 as will be discussed below.

The refrigerant circuit 6 interacts with the oil and water circuits via the refrigerant compressor 16 and heat exchanger 38, respectively. The circuit 6 also includes a further heat exchanger 44 which uses ambient air to cool hot high pressure refrigerant from the refrigerant compressor. The heat exchanger 44 includes three outlets. The first outlet 46 delivers refrigerant to an air conditioner 48 if such is provided on the vehicle via a valve 50. The refrigerant from the air conditioner is recirculated to the refrigerant compressor 16. The second outlet 52 from the heat exchanger 44 delivers refrigerant to the heat exchanger 38 via a valve 54. The third outlet 56 from the heat exchanger 44 delivers refrigerant to an intercooler 58 via a valve 60. The intercooler 58 chills air going into the engine 8. The intercooler comprises the third stage of an engine air cooling system. The turbocharger 28 heats air as a negative consequence of compressing it. The heated air is delivered to the air-to-air intercooler 42 for first stage cooling of air compressed by the turbocharger. The second intercooler 40 chills the air further and thus is the second cooling stage. The intercooler 58 receives the chilled air from the intercooler 40 to chill the air even more. Since the air from the intercooler 58 is the coldest (i.e. pure refrigerant), it is most effective as the third or last chilling stage, just prior to introduction to the engine. The refrigerant from the intercooler 58 is recirculated to the refrigerant compressor 16.

The refrigerant circuit is not required in all instances. That is, the heat energy recovery engine cooling system of the invention will operate efficiently with just the oil and water circuits by circulating oil from the engine outlet 12 directly to the turbocharger 28—or to the heat exchanger 30 where there is no turbocharger—and by circulating water from the air-to-steam intercooler 36 directly to the pump 34.

However, the refrigerant circuit is beneficial if the cooling system needs to be more compact than if the air-to-steam intercooler 36 were the only mechanism for converting used steam back to water. It is also beneficial in a vehicle which includes an air conditioner. Moreover, by cooling the water from the air-to-steam intercooler 36, the cold water going through the air-to-water intercooler 40 makes the intercooler more efficient.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A cooling system for internal combustion engines compromising:
   (a) an oil circuit for circulating oil through the engine for lubricating and cooling the engine;
   (b) first heat exchanger means arranged within said oil circuit for cooling oil from the engine prior to recirculating the oil to the engine
   (c) a water circuit for circulating water through said first heat exchanger means to remove heat from the oil and to generate steam, said water circuit including
   (1) a steam engine connected with said first heat exchanger means; and
   (2) first intercooler means connected with said steam engine for converting said steam to water; and
   (d) a refrigerant circuit arranged between said oil and water circuit, said refrigerant circuit including
   (1) a refrigerant compressor driven by said steam engine and through which hot oil from the engine is circulated to produce high pressure refrigerant and hotter oil; and
   (2) second heat exchanger means through which refrigerant and water are circulated for cooling the water from said first intercooler means, whereby as oil within the oil circuit becomes hotter, more steam is generated by said first heat exchanger means to increase the output of said steam engine, thereby reducing the fuel consumption of and increasing the power obtained from the engine.

2. A cooling system as defined in claim 1, wherein the engine includes a turbocharger, said oil circuit passing through the turbocharger to further heat the oil, said water circuit including second intercooling means for cooling air from said turbocharger and heating water prior to delivery to said first heat exchanger means.

3. A cooling system as defined in claim 2, wherein said refrigerant circuit includes third heat exchanger means between said refrigerant compressor and said second heat exchanger means for cooling high pressure refrigerant from said refrigerant compressor with outside air.

4. A cooling system as defined in claim 3, wherein said water circuit includes a water pump driven by said steam engine for circulating water through said water circuit.

\* \* \* \* \*